March 10, 1936.  E. H. PIRON  2,033,862
RESILIENT WHEEL
Filed Dec. 19, 1932  2 Sheets-Sheet 1
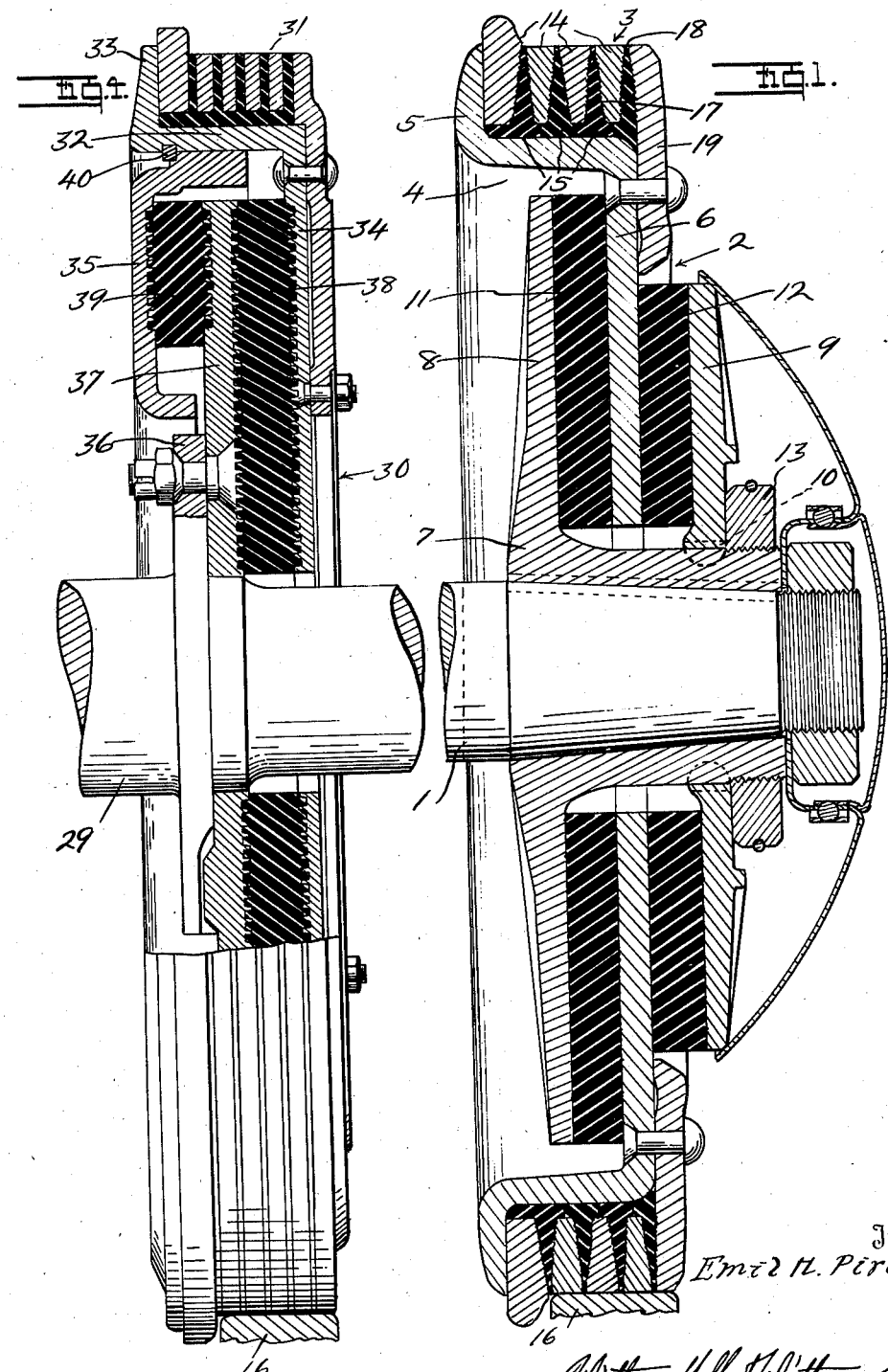

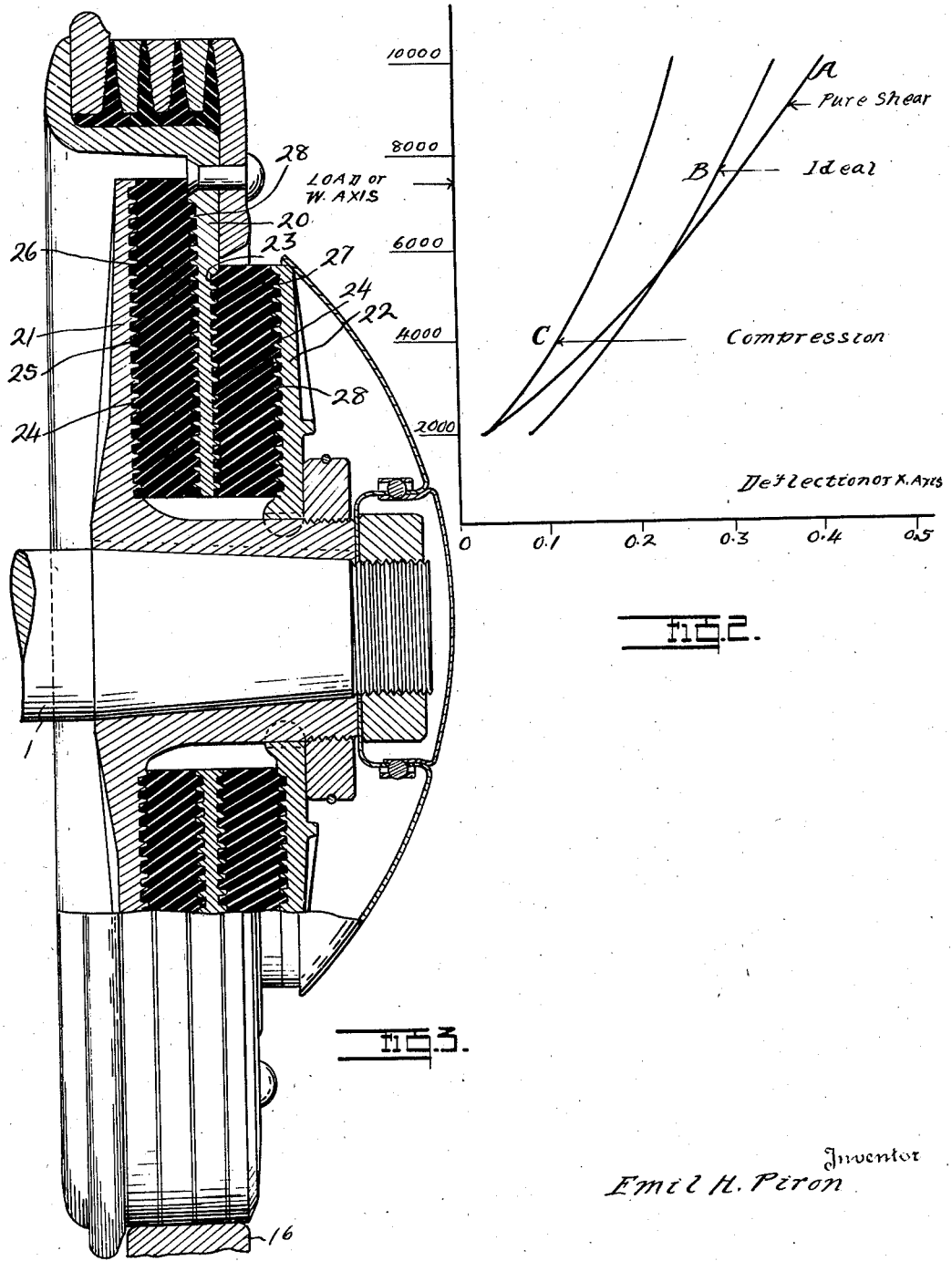

Patented Mar. 10, 1936

2,033,862

UNITED STATES PATENT OFFICE 2,033,862

RESILIENT WHEEL

Emil H. Piron, Highland Park, Mich., assignor, by mesne assignments, to Transit Research Corporation, New York, N. Y., a corporation of New York Application December 19, 1932, Serial No. 648,003

13 Claims. (Cl. 295—11)

This invention relates to a springing device employing rubber as the springing means and more particularly to the application of the principles of the device to vehicle wheels with the object of providing a wheel of improved riding and sound deadening qualities.

Another object of the invention lies in providing a wheel having resiliency of such an order that it will become an integral member of a vehicle springing system capable of materially reducing the magnitude of the accelerating forces resulting from impulses applied at its rim, such, for instance, as those occasioned by rail joints or cross-overs in the case of street cars, and which are ordinarily transmitted through the wheels.

The amplitudes of the vibrations transmitted to a vehicle are dependent among other things upon the amplitude and duration of the disturbance encountered by its wheels. These sources of disturbance are due to the condition of the road or track and, as regards the present invention, can not be prevented. However, the frequencies of the vibrations transmitted to the vehicle are dependent upon the resiliency of its springing system, and it is upon these frequencies or periods of oscillation that riding qualities and sound emission depend. Resiliency may be defined as deflection under loading and the resiliency as measured by deflection under a given loading is known as the load deflection ratio. If the various degrees of deflection be plotted against various known loadings a load deflection curve may be obtained. As will now be demonstrated, it is essential to provide a springing system in which this curve may be definitely known and predeterminable according to a calculated selection. The factors of a springing system are the weight $w$ supported thereby, the slope $k$ of the load deflection curve at the point corresponding to the weight $w$ and the acceleration of gravity $g$. The period of oscillation $r$ is given by the expression $$r = 2\pi\sqrt{\frac{W}{Kg}}.$$

The principal disturbing factor in an oscillation as regards the imposition of stresses on the mechanical parts of the system and the discomfort occasioned to passengers in the vehicle is the value of the acceleration in the oscillation. It can be shown that for a given impulse, the acceleration produced in the oscillation increases as the period decreases and hence the springing system should have as long a period of oscillation as possible. If the riding qualities of a vehicle are to be constant, that is, if the vehicle is to be equally comfortable irrespective of the load or number of passengers carried, it is evident that the period of oscillation must be substantially constant. This is a requirement that the ratio $$\frac{W}{K} = \text{a constant}.$$

If the deflection is represented by $x$ then the slope $k$ of the load deflection curve may be written $$\frac{\Delta W}{\Delta X}$$

and the condition $$\frac{W}{K} = \text{a constant}$$

may be written $$\frac{\Delta W}{W} = C\Delta X.$$

The integral of this differential equation is $\log_e \omega = cx + c_1$ where $c_1$ is another constant. This is the equation of the load deflection curve of a springing system preserving a constant period of oscillation independent of the variation of the load, hereinafter referred to as the ideal curve.

The present invention is directed to the application of the above principles of springing to a resilient wheel. In selecting a proper load deflection curve consideration should be given to the fact that there are other springs between the wheels and the passengers so that the wear and tear on the wheels themselves, the wheel bearings, the axles, and the driving mechanism are of more immediate importance than the selection of the ideal curve for the comfort of passengers. I have found that a set of conditions calculated to best serve these interests calls for a modification of the ideal curve to obtain a shorter period of oscillation under light loading and a longer period under heavy loading. In this manner, higher accelerations are imposed on the axle and the axle assembly under light loadings, but the accelerations of the impulses are reduced to a greater extent under heavier loading when the stresses are high than would be the case with the ideal curve. Such a curve is obtained when $$K = \frac{\text{increment of load}}{\text{increment of deflection}} = \text{a constant},$$

that is, when the load deflection curve is a straight line. It is therefore an object of this invention to provide a resilient wheel so constructed as to render the load deflection ratio thereof determinate and selectable whereby the desired load deflection curve for the wheel may be obtained.

As a corollary to the foregoing, it is another object to provide a wheel which may be depended upon to preserve its original predetermined resilient characteristics over a prolonged period of time by loading the rubber substantially uniformly and hence obviating concentrated fatigue.

When a wheel and axle system is being driven through a mechanical transmission by a motor there are masses in rotary motion which, if the speed be sufficient, accumulate a quantity of kinetic energy liable to impose dangerous stresses thereon if released too suddenly. For instance, when wheels slip on a rail permitting the motor to accelerate, and thereafter find good adhesion causing the wheel to suddenly resume a speed corresponding to the speed of the car, severe tangential stresses occur. It is therefore another object of this invention to provide a resilient wheel adapted to ameliorate such tangential shocks. It will be seen hereinafter that the accomplishment of this object resides in the application of the tangential shear uniformly over cushioning elements having substantial thickness and softness.

In carrying my invention into successful practice it is essential to understand certain inherent qualities of rubber. For instance, if a mass of rubber be placed under compression the loading is not distributed uniformly throughout the mass. Also, if a shear loading be imposed by local extensions or obtrusions either small or large or by other designed shoulder formations arising from the loaded surfaces the stresses are not distributed continuously or uniformly through the rubber and a pure shear curve cannot be obtained. It is only by imposing the loading over the entire opposite surfaces which are in the line of action of the shearing forces that pure shear may be imposed on rubber. Furthermore, while it is possible to obtain a rubber to metal bond which will withstand severe shear loads as high as 800 pounds per square inch of surface, it is impossible with present knowledge to obtain such a bond which will withstand even such nominal loads as 15 pounds per square inch under a prolonged oscillatory movement such as is required by a vehicle wheel. It is therefore another object of this invention to provide a wheel which, by its construction, will so incorporate rubber as to withstand the oscillatory shearing load to which it is subjected in actual use. In carrying this into effect I employ an arrangement of wheel parts capable of imposing a continuous pressure over the opposed surfaces of the rubber and I then apply the shear load in a direction substantially normal to the direction of the application of pressure, the pressure being in excess of the shear load by a margin sufficient to obviate slippage of any constituent part, that is, the product of the pressure applied to the rubber surfaces times the coefficient of friction between the rubber and the retaining plates being in excess of the shearing force.

While the foregoing explanation is generally applicable to all impulses transmitted through the wheel and particularly to those causing a vertical displacement of the hub with respect to the rim, special consideration should also be given to one other major motion. Thus, a vehicle running on rails has a horizontal weaving motion known as "nosing" which causes it to assume a temporary direction of travel at an angle to the rails. When the vehicle is at speed this "nosing" movement causes the imposition of severe thrust transversely of the wheel rims which in the case of a resilient wheel, as herein described, is transmitted to the rubber and to the shear plates. The resilient wheel is expected to substantially reduce the acceleration of the motions imparted thereto from this source. If the transverse movement of the rim relative to the hub be unduly restricted such a reduction can not be accomplished, so that even though a wheel function perfectly with respect to the vertical, undue restriction of this transverse motion will forestall the elimination of noise and the dampening of impulses from this source. On the other hand, if an unduly great amount of transverse resiliency be permitted, it is probable that upon encountering a conventional street car switch or frog, the wheel will not follow the intended rail, thereby causing a derailing of the vehicle and there will also be exaggerated nosing and wobbling movement during ordinary running. There are therefore highly important limitations in both directions and it is a further object of the invention to provide a wheel so constructed as to permit a substantial determinate degree of resilience between its rim and hub transversely of its rim in order that the exact amount of resiliency in this direction may be selectable. As will be hereinafter more fully explained, such a provision is dependent upon a maintenance of pressure over the resilient elements.

Another object is to provide a resilient wheel so constructed that it may be disassembled for the replacement of the worn rubber or other damaged member upon removal of a simple retaining means, this means upon re-assembly serving to impose pressure on the rubber as above described.

Other objects and advantages, either directly described or indirectly accruing from the favorable relation of parts will become hereinafter more fully apparent as reference is had to the accompanying drawings, wherein my invention is illustrated by way of example and not in a limiting sense and in which Figure 1 is a transverse section through a wheel, in accordance with my invention;

Figure 2 is a graph showing different load deflection curves;

Figures 3 and 4 are views similar to Figure 1, showing modified constructions.

As shown in Figure 1, I is the axle of the vehicle which in the present instance is a street car and 2 is the wheel which is mounted upon and driven with the axle. 3 is the tire or tread portion of the wheel and 4 is the cylindrical rim member for receiving the tire or tread portion and provided with the integral radially outwardly extending flange 5. Extending radially inwardly from the edge of the rim opposite the flange 5 is the plate 6 which is preferably integral with the rim and which may be called the loaded member. 7 is the hub of the wheel mounted on the axle and keyed thereto. This hub has the radially outwardly extending fixed flange or plate 8 at its inboard end and the radially outwardly extending plate 9 at its outboard end, the latter being non-rotatable relative to the hub, but movable axially thereof. As shown, the plate 9 is keyed to the hub by the Woodruff keys 10. Both the plates 8 and 9 may be called loading members.

The plate 6 is received between the plates 8 and 9 and imbedded in a mass of rubber. More particularly, 11 and 12 are rings or annular blocks of rubber arranged between the plate 6 and the plates 8 and 9 respectively. For urging the plates 9 and 6 and the rings 12 and 11 toward the plate 8 and imposing pressure upon the rings, I have provided a retaining means 13 in the form of a nut circumscribing and threaded upon the outboard end of the hub and abutting the plate 9.

The surfaces of the rings 11 and 12 perpendicular to the wheel axis are relatively large and are entirely or completely in contact with the plates 6, 8 and 9. These plates are forced toward each other and maintained in position to impose a substantial and continuous pressure upon the rings of sufficient magnitude to set up a frictional lock against slippage of the rings relative to the plates under normal operation of the wheel. In operation the rings are subjected to loading in a radial direction by the car weight, vertical irregularities of the track and so forth, and to loading of a tangential character by driving and braking forces. The forces producing these loadings are in a direction substantially normal to the direction of the clamping force imposed by the nut 13. The rings are thus subjected to pure shear stresses by the radial and tangential forces.

The angularity or direction of the shear load-deflection curve for vertical motion is dependent, among other things, upon the softness and the thickness of the rings of rubber 11 and 12 and upon the provision of a perfect shear resisting condition over the entire surfaces thereof. To obtain maximum resiliency, the rubber should be as soft and as thick as possible when in compressed position, in order that there may not be an undue restriction of movement. On the other hand, there is a limit to the extent to which these requirements may be carried because of the increasing heating and ultimate destruction of the rubber, if an unduly large degree of resiliency is provided. The proper amount of transverse resiliency is also dependent upon the softness and the thickness of the rings of rubber and further upon a proper distribution of the loading in a transverse direction. The softness and thickness of the rings is such that when they are subjected to pure compression stresses, as controlled by the nut 13, they provide for the proper relative movement of the rim and the hub, both vertically and transversely or axially of the wheel. In any case, the rubber compound must be carefully chosen, an example being a rubber compound containing 9 to 15 per cent of zinc oxide and the necessary amount of gas black to give a hardness of 35 to 50 degrees, as measured by a durometer, and also the necessary amount of sulphur and other ingredients required for the curing. In any event, the pressure upon the rings, as controlled by the nut, is sufficient to obviate slippage of any constituent part, but an increased pressure may be selected by adjusting the nut to secure a smaller amount of transverse resiliency.

Figure 2 illustrates the desired load deflection curve secured by an actual test of one of my wheels, as compared with other load deflection curves previously discussed. The desired load deflection curve is designated A in which $$K = \frac{\Delta W}{\Delta X}$$

is constant but $$\frac{W}{\frac{\Delta W}{\Delta X}}$$

and period increase as $w$ increases. This curve A is a pure shear or straight line curve and, when employed in the wheel springing system, sets up a condition whereby the period is lengthened and hence the accelerations of the impulses transmitted to the axle assembly are reduced during periods of heavy loading. B designates the "ideal" load deflection curve in which $$K = \frac{\Delta W}{\Delta X}$$

increases but $$\frac{W}{\frac{\Delta W}{\Delta X}}$$

and period are constant as $w$ increases. A spring system constructed in accord with this curve would give equally comfortable riding qualities for passengers, regardless of the loading. C designates a curve which is a typical compression curve for rubber in which $$K = \frac{\Delta W}{\Delta X}$$

increases but $$\frac{W}{\frac{\Delta W}{\Delta X}}$$

and period decrease as $w$ increases. A springing system constructed in accord with this curve would give increasingly severe stresses on the axle assembly and increasing discomfort to passengers with increasing loads and is to be avoided.

In connection with Figure 2 and as a specific example, the following has been found suitable for a street car wheel of conventional over-all diameter, if the wheel is to be given a total load of 3000 pounds when the car is empty and 5000 pounds when the car is fully loaded. 400 square inches of rubber surface are used in shear and each ring of rubber is one inch thick and placed under a continuous average compression of 50 pounds per square inch. The shearing force on the rubber under 5000 pounds car load is 12.5 pounds per square inch. The coefficient of friction between rubber and steel parts pressed together is approximately 0.5. Thus, a compression of 25 pounds per square inch is required to provide the necessary friction and the friction obtained by a compression of 50 pounds per square inch is twice as great as necessary for normal loading, which represents the factor of safety.

Referring again to Figure 1, it is desirable that the tire be so constructed as to prevent, as far as possible, the wheel and the rim thereof from oscillating in such manner as to emit audible frequencies. The tire comprises the series of metal rings 14 and the series of rubber rings 15. The ring 14 in contact with the flange 5 is of greater diameter than the other rings 14 and forms the wheel flange for engaging the side of the rail 16. The rubber rings 15 have base portions between the rim 4 and the bases of the metal rings 14 and radially outwardly extending portions located between the metal rings 14. The sides of these metal rings have the portions 17 which are preferably serrated and which converge toward each other in a radially inward direction and the smooth or plane portions 18 which are slightly spaced apart and which extend substantially parallel. 19 is the clamping ring for urging the metal and rubber rings toward the flange 5, a continuous pressure being imposed on the rubber of such magnitude as will set up a frictional locking engagement between the metal rings, the rubber and the rim sufficient to obviate any creepage of the rubber under the shifting points of load application during operation of the wheel. The trapezoidal cross section of the metallic rings thus acts to resist the tendency of the rubber to flow outwardly therepast. The inboard side of this clamping ring is also preferably formed in the same manner as the sides of the metal rings 14. The rings have considerable depth in order that they may have sufficient strength to resist local deformation under all shocks which they may encounter during operation.

While the rings of rubber 11 and 12 are effectively secured to the plates 6, 8 and 9 of Figure 1 by a pressure providing a safety factor, the safety factor may be increased by vulcanizing the rings to the plates or by other bonding means. An abnormal or accidental loading such, for instance, as when a street car is derailed, render such further safety factor desirable. As shown in Figure 3, the additional safety factor is provided by forming the loaded plate 20 and the loading plates 21 and 22 with the series of circular grooves 23 and 24, respectively, which are concentric with the axis of the axle and by also forming the series of circular concentric interfitting ribs 25 in the rings of rubber 26 and 27. The grooves and the ribs may extend substantially over the entire or complete contacting surfaces of the plates and the rings of rubber and inasmuch as the strength of the metal of the plates is greater than that of the rubber of the rings, the ribs 28 intermediate the grooves 23 and 24 in the plates may be considerably less in thickness than the ribs 25 on the rings. I also preferably impart to the ribs 28 a tapering form as they extend from the bodies of the plates toward the rings, so as to form the grooves 23 and 24 with flaring sides for receiving the correspondingly tapered ribs 25. The parts of the wheel, with this exception, are the same as shown in Figure 1 and the pure shear load deflection curve is not disturbed by the pressure of the grooves and ribs until they actually function.

Figure 4 discloses another modification in which 29 is the axle of the vehicle, which also in the present instance is a street car, and 30 is the wheel which is mounted upon and driven with the axle. 31 is the tire or tread portion of the wheel and 32 is the cylindrical rim for receiving the tire or tread portion, it being formed with the integral radially outwardly extending flange 33. 34 is a plate which is preferably integral with the rim and extends radially inwardly from the edge of the rim opposite the flange 33. 35 is a second plate extending radially inwardly from the rim 32 and spaced from the plate 34. These plates 34 and 35 may be called the loaded members. The axle 29 has the radially outwardly extending fixed flange 36 to which is fixedly secured the radially outwardly extending plate 37 which may be called the loading member and which is received between the plates 34 and 35. 38 and 39 are rings or annular blocks of rubber between the plates 37 and 34 and the plates 37 and 35 respectively and these rings are effectively secured to the plates with an additional safety factor in the same manner as the rings of Figure 3 to their plates, with the exception that the desired pressure exerted by the plates upon the rings is secured by the means for securing the plate 35 to the rim 32, this means in the present instance comprising the ring 40, which is placed after the application to the wheel of pressure in an axial direction.

What I claim as my invention is:

1. In a wheel, a hub, a plate extending radially outwardly from said hub, a rim provided with an annular recess in its inner face, a plate extending radially inwardly from said rim at each side of said first mentioned plate, a mass of rubber between said first mentioned plate and each of said second mentioned plates, and a ring engaging the recess in said rim and abutting one of said last mentioned plates, said ring through said last mentioned plates imposing substantial pressure on said masses of rubber whereby said last mentioned plates are supported by said masses of rubber in shear.

2. A wheel comprising a rim structure, a wheel structure in intercalated relation with said rim structure, bodies of rubber between said structures, and means comprising a snap ring for holding said structures in association with the rubber bodies held compressed between them a determinate amount in the axial direction.

3. A wheel comprising a rim structure, a wheel structure in intercalated relation with said rim structure, at least one body of rubber between axially opposed faces of the structures, said rim structure having an inwardly facing recess and means comprising a retaining member cooperating with a wall of said recess for holding the structures with said rubber body compressed between them in the axial direction.

4. A wheel comprising a rim structure and a wheel structure including radial plate members with alternate plates carried by said rim structure and said wheel structure respectively, elastic discs separating said plates, one of said plate members being separately removable, and a snap ring for retaining all of said plate members in assembly against said elastic discs and for imposing a determinate amount of compression on said elastic discs.

5. A wheel comprising a rim structure, opposed parallel plate members radiating inwardly from and carried by said rim structure, a hub having a third plate member radiating therefrom and extending between said parallel plate members, masses of elastic material between said third member and said parallel members, and a snap ring between said rim structure and one of said parallel members for retaining said members in compressed assembly against said masses of elastic material.

6. A wheel comprising a rim structure of Z cross section forming an interior annulus having a radial wall thereon and an exterior annulus, the interior annulus having a circumferential groove in substantial axially spaced relation with the radial wall thereof, a plate member adjacent said groove, a second plate member radiating from said wheel structure and extending between said radial wall and the first named plate member, elastic rings separating said second plate from said first plate and said radial wall, and a snap ring in said groove in contact with said first plate adapted to impose a determinate amount of compression on said elastic rings.

7. In a cushioned joint, a rim member having an inwardly directed flange and an annular groove axially spaced from said flange, an inner member disposed within said rim member and having a web overlapping said flange, a plate disposed within said rim member and overlapping said web, cushioning material disposed between said web and said flange and said plate, and a locking ring disposed in said groove and abutting said plate and holding said joint in assembled relationship.

8. The joint described in claim 7 together with means for holding said locking ring in locking relationship.

9. The joint described in claim 7 together with means for holding said locking ring in locking relationship, comprising an abutment provided on said plate and engaging the inner cylindrical surface of said locking ring.

10. In a resilient joint, a plurality of members having at least one resilient element disposed therebetween in a state of compression, said members having portions disposed in telescoping relationship, the telescoping portion of one of said members having a groove provided therein, and a locking ring disposed in said groove and abutting the telescoping portion of said other member.

11. The joint described in claim 10, wherein said other member is provided with an abutment for preventing said locking ring from escaping from said groove.

12. A wheel comprising a metal wheel center having a disk-like web with shoulders on both sides thereof located inwardly from its periphery, a metal rim member having an inwardly extending flange near one end overlapping the peripheral portion of said web, a wide ring mounted in the bore of said rim member, said flange and ring having shoulders of greater diameter than said first mentioned shoulders, rings of cushioning material interposed between the marginal portion of said web and the flange and ring of said rim member with their corners adjacent said shoulders.

13. A wheel comprising a metal wheel center having a disk-like web with shoulders on both sides thereof located inwardly from its periphery, a metal rim member having an inwardly extending flange near one end overlapping the peripheral portion of said web, a wide ring mounted in the bore of said rim member, means for locking said ring in place comprising a groove in said bore and a split ring in said groove and extending outwardly therefrom, said flange and ring having shoulders, and rings of cushioning material interposed between the marginal portion of said web and the flange and ring of said rim member, with their corners adjacent said shoulders.

EMIL H. PIRON.